June 5, 1962 R. G. WEBSTER 3,037,224
DEVICE FOR WASHING TRUCK BODIES
Filed May 5, 1958 5 Sheets-Sheet 1

INVENTOR.
ROBERT G. WEBSTER
BY
*Price and Heneveld*
ATTORNEYS

INVENTOR.
ROBERT G. WEBSTER
BY Price and Heneveld
ATTORNEYS

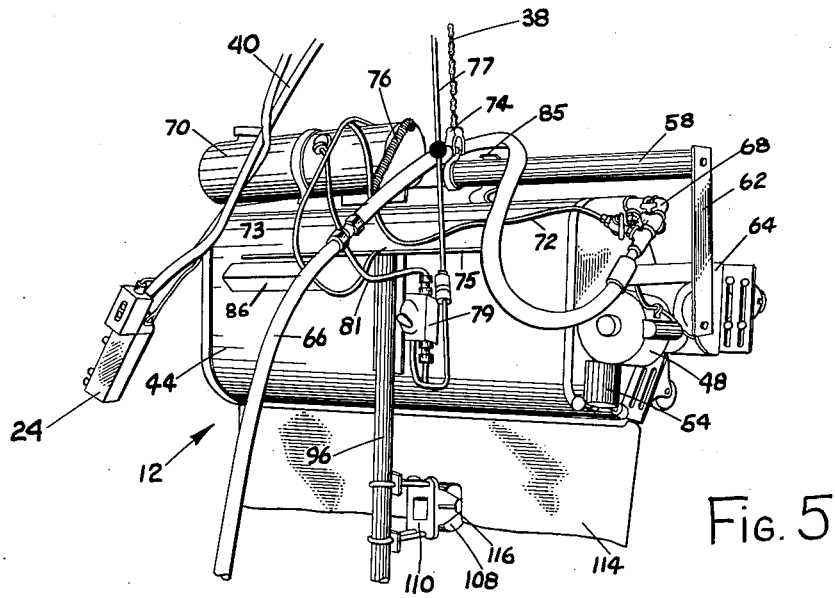
Fig. 5
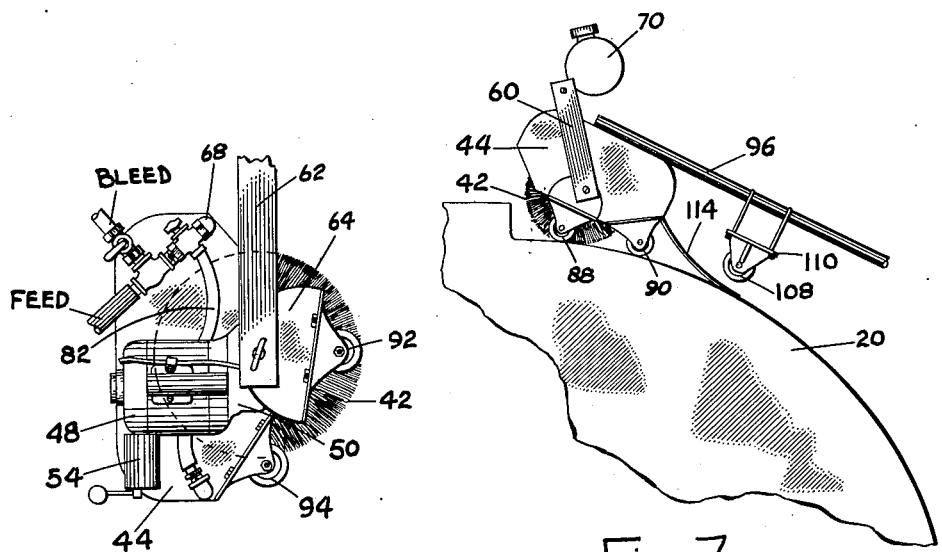
Fig. 6
Fig. 7
INVENTOR.
BY ROBERT G. WEBSTER
ATTORNEYS June 5, 1962 — R. G. WEBSTER — 3,037,224
DEVICE FOR WASHING TRUCK BODIES
Filed May 5, 1958 — 5 Sheets-Sheet 4

INVENTOR.
ROBERT G. WEBSTER
BY Price and Heneveld
ATTORNEYS

June 5, 1962  R. G. WEBSTER  3,037,224
DEVICE FOR WASHING TRUCK BODIES
Filed May 5, 1958  5 Sheets-Sheet 5

INVENTOR.
BY ROBERT G. WEBSTER
ATTORNEYS

United States Patent Office 3,037,224
Patented June 5, 1962

3,037,224
DEVICE FOR WASHING TRUCK BODIES
Robert G. Webster, Muskegon, Mich., assignor to Wagoner Webster, Inc., Muskegon Heights, Mich., a corporation of Michigan
Filed May 5, 1958, Ser. No. 732,885
7 Claims. (Cl. 15—21)

This invention relates to truck washing devices in general and more particularly to devices suitable for washing the curved surfaces of tank truck bodies and the like.

Both large and small companies having trailer trucks, tank cars, and the like for hauling their products over the nation's highways and railroad systems have become increasingly aware of the importance of keeping their equipment clean. In so doing, the serviceable life of equipment is considerably increased, the maintenance problems are minimized, a good appearance is presented to the public, and each transportation vehicle becomes a respectable sign board for the company's name and the names of the company's products.

The problem of keeping a trailer truck or similar vehicle clean usually requires either hand washing or special wash equipment. Much larger, heavier, and more durable washing equipment is required than is used with passenger car vehicles.

Although special adaptations of passenger car washing equipment have been developed for those trailer trucks having vertical side walls, no acceptable equipment has been devised for washing the curved surface of tank truck bodies or other vehicles having curved side wall contours. Road dust, dirt, and the like are more readily collected on vehicle bodies having curved surface contours. This is particularly true of tank truck bodies. Oil carrying tank trucks are frequently seen with dirt streaks and blotches where the oil has spilled on the surface of the truck and has thereafter collected road dirt and grime. Such dirt streaks are unlike ordinary road grime in that they are dark, irregular, and heavily caked. Such dirt is unusually difficult to remove and usually requires some form of power driven equipment for cleaning the truck body.

Unlike truck washers for cleaning trailer trucks having vertical side walls, equipment used for tank truck bodies and the like must be adjustable for the height of the tank truck, as well as its length, and be able to travel towards and away from the truck in transversing the curved surface thereof. Some means of allowing the brush scrubbing mechanism to follow the curved contour of different truck bodies must also be provided. Means for covering a large surface at one time is desirable. Means should be included to insure an evenly distributed wear of the scrubbing brush. And, quite naturally, as few men as possible should be required to operate this type of equipment.

It is here proposed to provide a device adaptable for washing tank truck bodies and other curved surfaces. The disclosed device is particularly capable of transversing the curved surface of tank truck bodies.

The disclosed device includes a power driven rotatable brush mounted within a suitable housing and supported in a free hanging horizontal position from overhead guide rails. The housing includes a pair of spaced guide wheels at each end thereof which are engaged to the tank truck body. The guide wheels maintain the brush housing in the same relative disposition to the tank truck body while the housing and brush are moved over the curved surface of the tank body. The guide wheels are adapted to prevent undue brush pressure and thereby assure better brush scrubbing. The guide wheels are disposed relative to the axis of the brush rotation to minimize the reactionary tendency of the housing member to rotate about the brush.

The housing and rotatable brush are supported in a free hanging position from a carriage member traveling on overhead guide rails. The housing and brush unit are displaced from their free hanging relation by engagement with a tank truck body disposed under the guide rails. The brush is held in engagement with the tank body by the weight of the brush and housing seeking to return to their free hanging position. Thus the brush bristles are not unduly compressed as when the brush is forcefully held against the surface to be cleaned.

A long handle is secured to the back of the brush housing and includes an optional wheel provided thereon and disposed to engage the tank truck body. The optional wheel is not normally engaged with the tank truck body when the guide wheels are engaged therewith. However by depressing the extended handle the optional wheel and one each of the pairs of guide wheels are engaged to the truck body. This movement will tilt the brush housing sufficiently to enable the rotating brush to clean the side walls of a cat walk such as is normally provided on a tank truck body.

The extended handle is self-telescoping to enable an operator to keep hold of the handle in the vertically raised position of the brush member.

A special control box, which is connected to the carriage means on the guide rails, is held in the other hand of the operator. The electrical control box is operatively interconnected to the carriage means and includes switches controlling the raising and lowering of the brush member, its axial travel towards the front or back of the tank truck, and its movement towards or away from the truck body. The switch box is a one hand portable control device having parallel spaced rows of control buttons thereon. Adjacently disposed of these buttons are for controlling opposite directional movements of the brush member relative to the tank truck body. The adjacently disposed buttons are so arranged that they may be operated selectively by the same finger. A special reverse button is provided on the control box and is interconnected with certain of the adjacently disposed buttons. The reversing switch or button enables the operator to reverse the operating functions of certain of the adjacently disposed buttons to correlate his relocation from one side of the tank truck body to the other side thereof. In this way an operator need not remember which side of the truck he is on in order to get a forward or reverse, left or right, movement of the truck scrubbing device.

For reasons of providing a more practical piece of equipment than one which serves only one purpose, it is also here proposed to provide means whereby the proposed tank truck body scrubbing device may be used to clean the vertical side walls of normal trailer trucks. Such means includes an arcuate sector secured to one end of the scrub brush mechanism and formed to include a guide slot receiving the chain or other support means therethrough. The arcuate sector includes suitable counterbalancing means so that the brush mechanism may be tilted to an angular or upright position and the free hanging support means may be clamped in such position. Numerous different advantages are possible in having the brush mechanism capable of being disposed in a horizontal, vertical or any intermediate angular position.

The inventive concepts just mentioned and others will be more apparent in a reading of the description which follows and a study of the illustrations relating to a tank truck washing device of the type proposed.

In the drawings:

FIG. 5 is a perspective view of the back side of the proposed washing device.

FIG. 6 is an end view of the proposed washing device.

FIG. 7 is a schematic end view of the proposed equipment showing the relation of the different guide wheels to the curved surface of the tank truck body upon which they travel.

Figure 1:
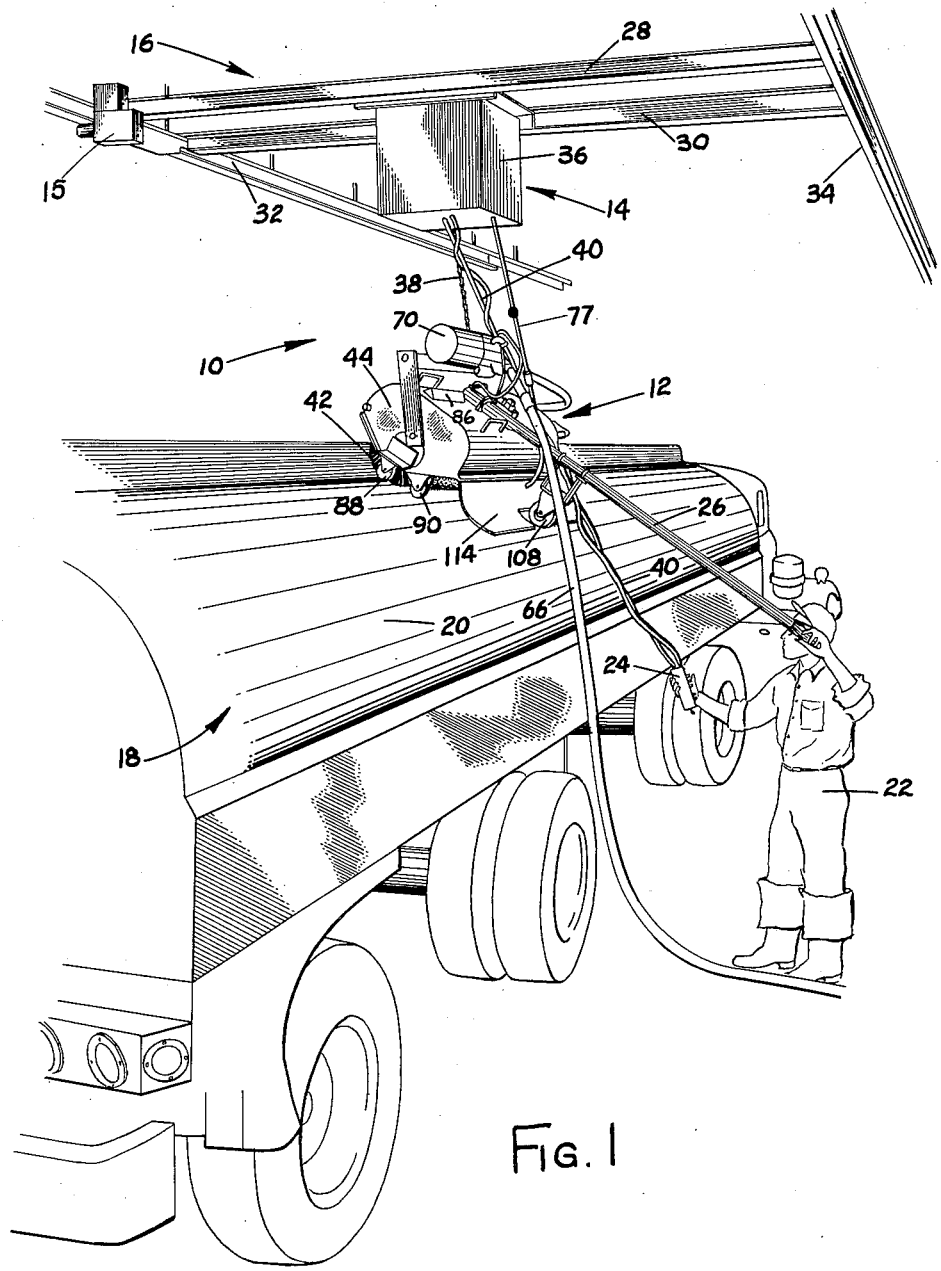
FIG. 1 is a perspective view of the proposed equipment in use.

Referring specifically to FIG. 1, the proposed tank truck washing device 10 includes the tank truck engaging brush and housing unit 12 which is disposed and supported in a free hanging relation from a carriage member 14 engaged and supported on overhead guide rails 16. A tank truck 18 disposed under the guide rails has its tank body 20 disposed to displace the washing unit 12 from its normally free hanging position so that the weight of the unit holds it engaged with the tank truck body 20. An operator 22 controls the movement of the washing unit 12 by an electrical control box 24 held in one hand and a guiding handle 26 held in his other hand.

Other means of supporting the truck body washing unit in a free hanging position may be employed, other than the suggested guide rails 16. However, the disclosed guide rail arrangement is preferred. The carriage member 14 is disposed between spaced guide rails 28 and 30 and is adapted to travel the length of such rails. These rails are in turn supported and guided on rails 32 and 34 disposed transversely thereof and, as shown in FIG. 1, extending in the direction of the truck 18 received thereunder. The carriage member 14 is movable between the side guide rails 28 and 30 and along the length of rails 32 and 34 by drive and control means disposed in the housing 36 shown. Any of numerous different known drive and carriage control means may be employed.

The brush washing unit 12 is supported from the carriage member 14 by a chain hoist or other means 38 and is vertically adjustable by commonly known chain hoist control means within the carriage housing 36.

The movement of the carriage member 14 on the guide rails 16 and of the wash unit 12 relative to the carriage member 14 is controlled by the operator 22 by means of the control box 24 he holds in one hand and which is connected by electrical lead 40 into the control means in the carriage housing 36.

Figure 11:
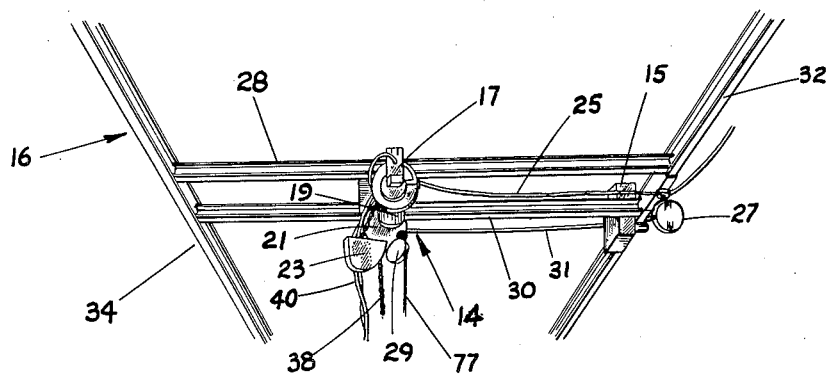
FIG. 11 is a perspective view of the carriage unit with the housing removed.
Figure 12:
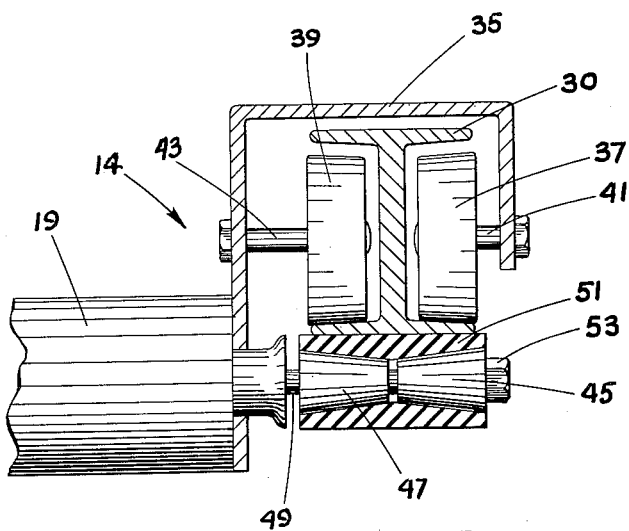
FIG. 12 is a cross sectional view of the friction drive means for the carriage.

The preferred form of drive for carriage 14, and the interconnected carriage supporting rails 28 and 30, is frictional rather than a positive drive arrangement and is as shown by FIGS. 11 and 12. The guide rails 32 and 34, as well as the carriage supporting rails 28 and 30, are formed as I-beams. The drive units are substantially the same for affecting both lateral and transverse movement of the carriage 14, consequently only the carriage drive unit 14 is shown in any detail.

Referring to FIG. 11, the carriage unit includes a cable reel 17, drive motor 19, chain fall 21, and a chain catcher 23. The cable reel 17 receives the service line 25 for the drive unit 15, including the chain fall 21. The small cable reels 27 and 29 are for the electrical control service line 31 connected to the washer unit 12 via service line 77.

The chain catcher 23 is disposed to receive the free loop of support cable 38 from the chain fall unit 21, thereby preventing its free fall engagement with a truck body 20 thereunder.

The carriage drive unit 14 is shown in FIG. 12. The carriage driving unit 14 is supported between the rails 28 and 30 and is in drive engagement with rail 30 and in following engagement with rail 28. The drive unit includes a yoke member 35 secured to the end of the motor 19 and extending over the guide rail 30. The yoke member supports guide wheels 37 and 39, on shafts 41 and 43, for guided engagement within the channel recesses on opposite sides of the I-beam rail 30. Drive motor 19 has a pair of axially adjustable cones 45 and 47 on its shaft 49. A frictional drive roller 51, with a V-belt inner surface, is disposed on the cones and is engaged with the underside of the I-beam rail 30. The extent of frictional engagement between roller 49 and the I-beam rail 30 is adjusted by tightening nut 53 to draw the cones 45 and 47 closer together.

The tank truck wash unit 12 includes a revolving or rotating scrub brush 42 which is disposed within a suitable cylindrical housing 44 having an open side 46 to expose the brush therethrough. A suitable motor 48 and gear drive reduction unit 50 is mounted on one end of the housing 44 and is connected to the shaft 26 of the brush 42 by a suitable coupling 52. A motor reversing control box 54 is connected to the same end of the housing 44.

The housing member 44, with the brush 42, are engaged to the chain hoist means 38 by a suitable coupling 56 secured to a tubular cross brace 58 having depending arms 60 and 62 secured to each end thereof. The ends of the arms 60 and 62 are pivotally engaged to the housing 44. The housing includes an extended portion 64 to accommodate the drive motor 48 and gear reduction unit 50. The arm 62 is secured to this extended housing portion. Both arm members 60 and 62 will be noted to be secured to the housing 44 near the axis of rotation of the brush member 42.

A liquid supply line 66, from a suitable source, is connected by a hose couplinng 68 to the wash unit 12. Fresh water or water and a detergent may be supplied through this line. A separate detergent spraying device may also be used. If desired a special detergent tank 70 may be mounted upon the brush housing 44. If the detergent tank is used a water line 72 is connected between the hose connection 68 and the detergent tank and a detergent feed line 73 is connected between the tank and a detergent spray manifold 75. The detergent spray manifold 75 is shown mounted on the backside of the housing, in FIG. 5. Detergent is directed through the back of the housing directly onto the rotating brush. A small pump motor may be mounted in the detergent tank. In such case an electrical feed line 77, a pump motor control 79, and suitable connecting electrical line 81 is required.

A suitable hose clamp 74 is preferably supplied on the supporting cross member 58 to take the strain from the liquid supply line 66 which would otherwise be placed on the hose connection 68. Secondary means of relieving this weight or tension may also be provided, such as the coil spring 76 shown in FIG. 5.

The liquid supply line 66 is engaged to the hose connection 68 at one end of the housing member 44. This hose connection 68 includes T joints, bleed valves, and take-offs as required to supply liquid to the detergent tank 70, if used, and to the washer spray nozzle manifolds 78 and 80.

Figure 4:
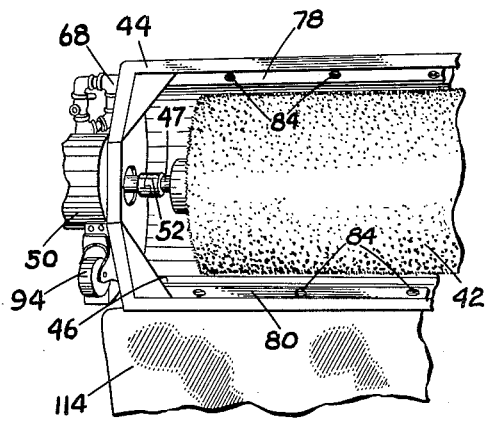
FIG. 4 is a front perspective view of one end of the proposed washing device.

The spray nozzle manifolds 78 and 80 are shown in FIG. 4 as extending along the edges of the opening 46 in the housing member 44 on each side of the rotating brush 42. The upper spray manifold 78 is directly connected to the hose coupling 68. The hose connection 82 extends from the hose coupling 68 to the lower spray manifold 80. The manifolds each include a plurality of spaced holes with suitable spray nozzles 84 secured therein. The spray nozzles direct water onto the rotating brush, and, depending on the rotational direction of the brush member, provide either scrubbing or rinsing water.

A pair of guide wheels 88 and 90 are secured to one end of the housing member 44. The wheels are rotatable about an axis parallel to that of the brush rotation. The wheels 88 and 90 are spaced apart and are preferably disposed to engage the tank truck body 20 on opposite sides of the rotational axis of the brush member 42. A similar set of guide wheels 92 and 94 are mounted on the other end of the brush housing 44. These wheels are not shown as disposed in tracking relation to each other as were the other wheels. This is due principally to the intervention of the motor 48 and drive unit 50. The one wheel 92 is secured to the housing extension 64. Both sets of guide wheels are however disposed to engage a tank truck body surface in the same manner so that, in combination, they will orient, center, and space the rotating brush member relative to the tank truck body.

The four wheels 88, 90, 92 and 94 as engaged to the curved surface of the tank truck body 20 will serve to maintain the brush housing 44 in the same relative position to the tank body as the wash unit 12 moves over the curved surface thereof. The wheels also serve to resist any tendency of the housing 44 towards relative reactionary rotation about the driven brush 42.

A guide handle 96 is secured to the back of the housing 44 centrally thereof and therefore between the guide wheels at the ends of the housing. The handle 96 extends out from the housing 44 and serves as the prime manual control means as will be described.

Figure 3:
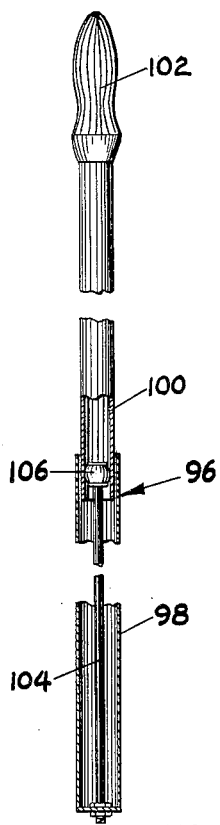
FIG. 3 is an enlarged view of the telescoping handle and a part thereof.

The guide handle 96 is shown by FIG. 3 to include a tubular portion 98 which is secured to the housing member 44 and has a smaller tubular member 100 telescoped therein. The latter has a handle grip 102 provided at the end thereof. A rod 104, with a frictional ball 106 on the end thereof, is disposed concentrically within the tubular member 98 and is adapted to receive the end of the last mentioned tubular member 100 thereover. The frictional ball 106 provides a means of holding the telescoped parts of the guide handle in any adjusted relation.

A single guide wheel 108 is secured by a suitable bracket 110 to the handle member 96. The bracket 110 is provided to dispose the wheel substantially within the plane of the other guide wheels 88, 90, 92 and 94. Since the guide wheels and the optional wheel 108 are all in the same plane, it is obvious that they are not all engaged with the curved surface of the tank truck body 20 at the same time. When the four guide wheels 88, 90, 92 and 94 are engaged with the tank truck body the optional wheel 108 is not so engaged. When the optional wheel 108 is engaged to the tank truck body by depressing the guide handle 96, the housing is rotated about the rear guide wheels 90 and 94 and these three wheels alone engage the tank body.

The wheel 108 on the guide handle 96 is used when it is desirable to reorient the brush housing 44 relative to the tank truck body 20 by lifting the forward edge thereof. This raises the driven scrub brush 42 from the tank body 20 and disposes it in a position to engage and clean the vertical side wall of a cat walk 112 or the like on the top of the tank truck body.

A water spray shield 114, formed by a rubber or other plastic sheet, is engaged with the after edge of the housing member 44. This protects the operator from the spray thrown up by the rotating brush 42. The shield has a cutout 116 to receive the optional wheel therethrough.

Figure 2:
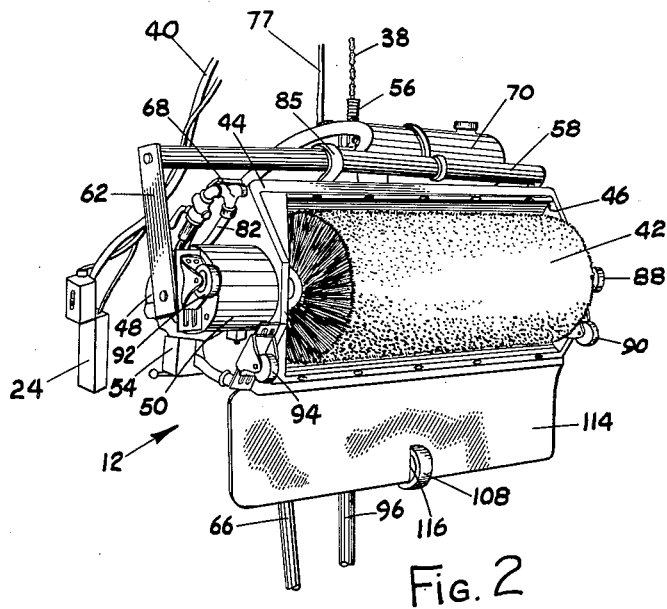
FIG. 2 is a perspective view of the front side of the proposed tank truck washing equipment.

The disclosed washer unit, as adapted for use in a free hanging horizontal disposition includes a counterweight 86 secured to the back of the brush housing 44. Such weight is adapted to offset the overhanging weight of the drive unit 48 in order that the washer unit remain in a substantially horizontal position. As regards the axis of brush rotation the weight of the washer unit is such as disposes the brush unit in the free hanging position shown in FIGS. 2 and 5. A safety strap 85 prevents the unit from flipping over by being disposed for engagement with the cross support 58.

As previously mentioned the movement of the washer unit 12 is controlled by an electrical control box 24 which is sufficiently small in size that it is readily adapted to be held in one hand by an operator. The box 24 includes controlled circuitry operatively interconnected with the carriage drive means and chain fall mechanism in the carriage housing 36. Parallel spaced rows of control buttons or switches are exposed on the face of the control box 24. One switch 120 controls the raising of the brush and housing member, another 122 lowers the washer unit. Control switch 124 moves the washer unit and carriage member in a direction toward the truck body, the other button 126 moves the unit and carriage in the opposite relative direction away from the truck body. Still another button 128 moves the carriage and washer unit in one direction across the truck body, and the next adjacent button 130 moves the carriage and unit in the opposite direction. It will be noted that those buttons having opposite operation functions are located near each other. The buttons are also disposed in staggered relation for easy access to one without interference from another.

With the control box 24 held in one hand an operator may readily select any one of the buttons with his thumb finger as it is extended across the box. He may also simultaneously operate the controls 120 and 124 for raising and moving the wash unit towards the truck body or the controls 122 and 126 for lowering and moving the wash unit back away from the truck body, with his thumb disposed diagonally across the staggered buttons.

A special reversing control switch 140 is provided on the control box. This switch is interconnected with certain of the adjacently disposed buttons, namely 124 and 126, and is operative to reverse their respective control functions. That is, the in and out directions will become the out and in directions of buttons 124 and 126. In this way, by use of the reversing switch 140, an operator may readily correlate the movements of the washer unit 12 to these respective directions as he knows them, depending upon which side of the truck body 20 he is on while controlling the wash unit. Although only one operative reversing interconnection has been shown and described others may be employed as desired.

*Modification*

It will be appreciated that the disclosed washer unit 12 may be used to clean a vertical side wall while supported in a horizontally disposed position. However since the height of the vertical side walls of the trailer truck is less than their length it is not practical to clean a vertical side walled truck with the washer unit disposed in a horizontal position. In order to clean the normal trailer truck or any vertical side wall of the tank truck it is preferable that the axis of the scrub brush rotation be disposed vertically.

Figure 8:
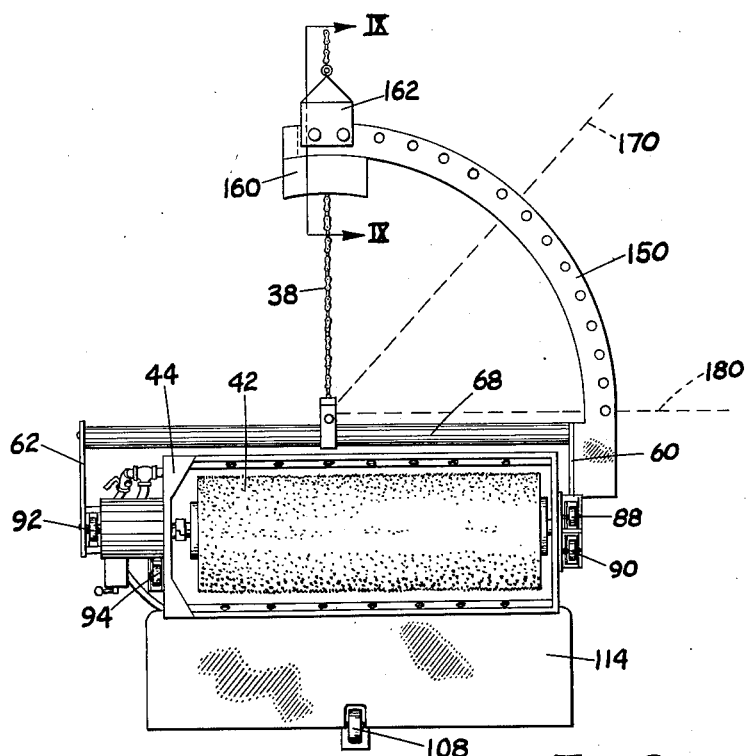
FIG. 8 is a front view of a modification to the proposed tank truck washing device.
Figure 9:
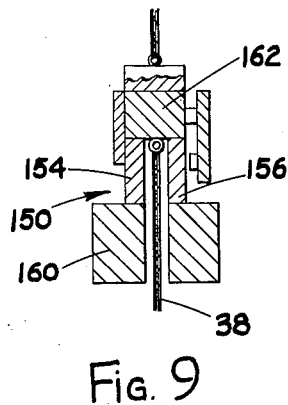
FIG. 9 is a cross sectional view of a part of the modified structure shown by FIG. 8, as seen in the plane of line IX—IX.
Figure 10:
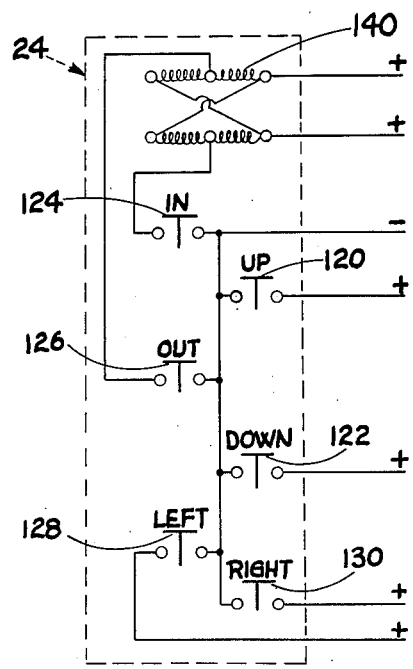
FIG. 10 is an electrical diagrammatical illustration of the proposed portable control box.

The proposed truck body tank washer 12 may be adapted to be disposed in a vertical position. Referring to FIGS. 8 and 9, the washer need be modified only to include an arcuate guide 150 which is secured to the arm 60 of the support means. The arcuate guide extends from one end of the brush housing 44 in an arcuate curve towards the supporting chain 38. The guide 150 includes spaced guide rails 154 and 156 through which the chain 38 is received. A counterbalancing weight 160 is disposed on the end of the arcuate guide 150. In the position of the brush housing shown in FIG. 8 the counterweight 160 is disposed over the center of gravity of the wash unit 12 and has no appreciable effect thereon.

A guide track follower 162 is secured to the chain 38 in close spaced relation over the guide rails 154 and 156 of the arcuate guide. This member may include solenoid means for actuating pin locators engageable within any of a plurality of holes 164 provided in the arcuate guide.

With the arcuate guide just described the housing member may be moved to an angular position by moving the handle 26 to an angular position which will tilt the housing and cause the chain to be disposed in a position relative to the housing such as is shown by the dotted line 170. The housing may also be moved to a vertical position in which case the chain 38 would be disposed as shown by the dotted line 180. The counterbalancing weight 160 is adapted to at least in part offset the weight of the hanging brush member. When he unit is hung vertically it is desirable that the lower end lead the upper end slightly to counteract the drag of the supporting chain 38 in moving the unit across a surface to be cleaned.

It should be appreciated that this is merely a suggestion as to how the proposed tank wash unit may be adapted for free hanging vertical use.

Operation

In the use of the proposed tank body washer 10 a tank truck 18 is positioned under the overhead guide rails 16. The tank body walls 20 are preferably disposed parallel to the guide rails 32 and 34.

The washer unit is assumed to be disposed in a normally free hanging position from the carriage member 14 which is itself supported by the guide rails 16. The truck wash operator 22 will move the carriage member 14 by pushing certain of the buttons on the control box 24 in order to dispose the wash unit 12 in a lowered position and with the carriage member 14 disposed over the truck body 20 so that the weight of the washer unit 12 holds the washer unit engaged with the truck body. By pressing certain of the buttons on the control box the washer unit is drawn upwardly by the chain support means 38. At the same time the carriage member is operated to travel transversely across the truck body. This combination of movements causes the washer unit 12 to travel over the curved tank body surface 20.

In the course of this movement the guide wheels 88, 90, 92 and 94 are disposed for engagement with the truck body surface 20 and to assure that the housing will be disposed with its open side 46 towards the truck body and the brush member 42 in engagement therewith. The guide wheels also assure that the housing will maintain the same relative position to the tank body 20 despite the curvature thereof.

If it is desired to clean a vertical wall at the upper end of the curved body surface 20 the operator swings the handle 26 down to engage the wheel 108 with the truck body surface. This pivots the housing and brush member about the rear guide wheels 90 and 94 and raises the brush member 42 and the forward edge of the housing member so that the brush may be more readily engaged with the vertical wall.

The guide handle obviously also serves other functions in guiding the housing member. The brush may be momentarily raised to pass over horizontal beading or other obstacles on the tank body.

The operator moves the washer unit axially at the end of its travel by actuating one of the control buttons or he may make a second pass over the truck body by pressing the buttons to lower and back off the washer unit from the tank truck body. The washer unit 12 may be guided down the truck body surface in the same manner that it was guided up the surface.

When the washer unit 12 is near the operator 22 the handle 96 may be in a telescoped position. However as the washer unit 12 moves farther away from the operator 22 the handle may be readily extended to a longer length by the telescoping action permitted. When the washer unit 12 is located low on the truck body, the handle may be released and allowed to hang free. The handle will automatically be telescoped to a shorter length upon engagement with the ground.

In washing the end of the tank truck body, if desirable, or in preparing for the next trailer truck having vertical side walls, the washer unit 12 may be disposed in a vertical hanging position if it includes such means as described in regard to FIG. 8.

While a preferred embodiment of this invention and a modification thereof has been described it will be understood that other modifications and improvements may be made thereto. Such of these modifications and improvements as incorporate the principles of this invention are to be considered as included in the hereinafter appended claims, unless these claims by their language expressly state otherwise.

I claim:

1. A tank truck body washer comprising overhead guide rails, carriage means mounted on said guide rails, a horizontally disposed rotatable scrub brush and a suitable housing therefor having free hanging means of engagement with said carriage means, said brush being exposed through said housing, power means operatively engaged to said carriage means and said hanging means for controlling the vertical, horizontal and axial movement of said horizontally disposed brush relative to a tank truck body received under said guide rails, guide wheels mounted on each side of said housing outboard of said rotatable brush and disposed for brush centering engagement with the surface of said tank truck body, and an elongated handle secured to said housing between said guide wheels and including a third wheel provided thereon and disposed for optional engagement with said tank truck body, said guide wheels and third wheel providing stabilized means of guiding said brush by said handle and for spacing said rotatable brush relative to said curved tank truck body.

2. A tank truck body washer comprising overhead guide rails, carriage means mounted on said guide rails, a horizontally disposed rotatable scrub brush and a suitable housing therefor having free hanging means of engagement with said carriage means, said brush being exposed through said housing, power means operatively engaged to said carriage means and said hanging means for controlling the vertical, horizontal and axial movement of said horizontally disposed brush relative to a tank truck body received under said guide rails, a pair of guide wheels mounted on each side of said housing outboard of said rotatable brush and disposed for brush centering and stabilizing engagement with the curved surface of said tank truck body, said guide wheels being spaced forwardly of and behind the truck body engaging surface of said brush for preventing the reactionary rotation of said housing relative to said brush, an elongated handle secured to said housing between said guide wheels and including a wheel provided thereon and disposed for optional engagement with said tank truck body, said optional wheel being engageable with said tank truck body upon a relative rotational movement of said housing by said handle lifting the foremost of said guide wheels from said tank truck body and substituting therefor the stabilizing engagement of said optional wheel.

3. A tank truck body washer for washing the exterior curved surface of a tank truck body and comprising; horizontally disposed longitudinal and transverse overhead guide rails having a traveling carriage member engaged therewith, a rotatable scrub brush and a suitable housing therefor having part of said brush exposed therethrough, means for supporting said housing to said carriage member in a horizontally disposed free hanging relation therefrom, liquid supply lines connected to said housing for supplying liquid to said brush, manually operated electrical control means connected to said carriage member for relocating said carriage on said overhead guide rails and connected to said support means for adjusting the vertical disposition of said brush and housing, pairs of spaced guide wheels secured to said housing member at each end thereof for spacing and centering said brush relative to said tank body, a telescoping guide handle secured to said housing between said pairs of guide wheels and extending therefrom, and an optional wheel secured to said handle and disposed substantially in the plane of said guide wheels, said hanging brush and housing being displaced from a free hanging position by a tank truck body disposed under said guide rails and being held in engagement therewith by their weight, said guide wheels being engaged with the curved surface of said tank body for continuously disposing said brush and housing in the same relative relation thereto, said control means being operable by one hand of an operator and said guide handle by his other hand for the controlled and guided movement of said brush over said tank body.

4. A one hand portable control box operatively interconnected to a work device adapted for movement in different and opposite directions, and comprising, a narrow box having a plurality of different control buttons exposed on the face thereof, said control buttons being arranged in two parallel rows, adjacent of said buttons being for related control functions as regards the movement of said work device, said adjacent buttons being disposed in staggered relation for selective actuation by a single finger extended across said box; and an operatively interconnected control means between certain of said adjacently disposed buttons for reversing the operative functions thereof to correlate the relocation of the operator of said box from one side to the other of said work.

5. A horizontally and vertically guided work device having means of actuation connected thereto, and a portable control box operatively connected to said work device actuation means; said control box comprising; a narrow control panel receivable in one hand of an operator, a plurality of control switches arranged in two parallel rows and exposed on the face of said panel, adjacently disposed of said switches in different rows being for related control functions, said adjacent switches being oriented for actuation by a single finger extended across said panel, and a separate switch operatively engaged to certain of said adjacent switches for reversing the relative operative function of said adjacent switches to correlate with the relocation of the control box operator from one side to the other of said work device.

6. A truck body washer installation, comprising; an overhead carriage member operable in transverse horizontal directions, vertically adjustable means disposed within said carriage member, a horizontally disposed power driven washer unit connected to said vertically adjustable means and supported in free hanging relation beneath said carriage member, and a portable one hand control box operatively connected to said carriage member and vertically adjustable means, said control box including separate operational controls for advancing and retracting said carriage member in either transverse horizontal direction permitted said carriage and for raising or lowering said washer supporting vertically adjustable means, said operational controls being disposed in adjacent parallel rows and each control in one row being in staggered relation to each control in the adjacent row for selected individual or multiple actuation, and those controls effecting movement of said washer unit towards and away from a vehicle body to be washed including reserving means for transposing the operational functions thereof in accord with an operator's position on one side or another of said vehicle body.

7. A truck body washer installation, comprising; an overhead carriage member operable in transverse horizontal directions, vertically adjustable means disposed within said carriage member, a horizontally disposed power driven washer unit connected to said vertically adjustable means and supported in free hanging relation beneath said carriage member, and a portable one hand control box operatively connected to said carriage member and vertically adjustable means, said control box including separate operational controls for advancing and retracting said carriage member in either transverse horizontal direction permitted said carriage and for raising or lowering said washer supporting vertically adjustable means, said operational controls being disposed in adjacent parallel rows and each control in one row being in staggered relation to each control in the adjacent row for selected individual or multiple actuation, said controls for advancing said carriage and raising said washer and those controls for retracting said carriage and lowering said washer being adjacently arranged in pairs for convenient simultaneous actuation to effect an arcuate travel of said washer unit relative to a surface of curvature to be washed, and means operatively interconnected between said controls for advancing and retracting said carriage for effecting a reversal of the operational functions thereof to enable correlation of such directional movements to different sides of an object being washed.

References Cited in the file of this patent

UNITED STATES PATENTS

| 125,369 | McEnery | Apr. 2, 1872 |
| 1,423,844 | Fenelon | July 25, 1922 |
| 2,419,819 | Buslawski | Apr. 29, 1947 |
| 2,553,378 | Miller | May 15, 1951 |
| 2,557,216 | Calabrese | June 19, 1951 |
| 2,803,025 | Morison | Aug. 20, 1957 |
| 2,832,849 | Walter | Apr. 29, 1958 |
| 2,843,686 | Ballou | July 15, 1958 |
| 2,854,680 | Wilson | Oct. 7, 1958 |

FOREIGN PATENTS

| 719,812 | Great Britain | Dec. 8, 1954 |
| 763,069 | Great Britain | Dec. 5, 1956 |
| 939,736 | Germany | Mar. 1, 1956 |